(12) United States Patent
Cuny et al.

(10) Patent No.: US 6,871,831 B1
(45) Date of Patent: Mar. 29, 2005

(54) MOLD VENT

(75) Inventors: André Cuny, Habay-la-Neuve (BE); Gérard Schmit, Attert (BE); Eric Nowak, Saint-Nicolas (BE); Georges Hubert Henri Gieres, Seltz (LU)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 10/741,712

(22) Filed: Dec. 19, 2003

(51) Int. Cl.⁷ .............................. B29C 33/10
(52) U.S. Cl. .............. 249/141; 415/28.1; 415/812
(58) Field of Search ............... 425/28.1, 812; 249/141

(56) References Cited

U.S. PATENT DOCUMENTS

| | | | |
|---|---|---|---|
| 3,885,618 A | * 5/1975 | Hodler | 425/812 |
| 3,989,430 A | 11/1976 | Dailey | 425/28 R |
| 4,021,168 A | 5/1977 | Dailey | 425/28 R |
| 4,140,470 A | 2/1979 | Pasch et al. | 423/544 |
| 4,351,789 A | 9/1982 | Sidles et al. | 264/130 |
| 4,492,554 A | 1/1985 | Carter | 425/383 |
| 4,708,609 A | 11/1987 | Yoda et al. | 425/28 D |
| 4,740,145 A | 4/1988 | Shurman | 425/28.1 |
| 4,759,701 A | 7/1988 | Carter | 425/28.1 |
| 4,795,331 A | 1/1989 | Cain et al. | 425/28.1 |
| 4,987,946 A | 1/1991 | Van Riet | 164/305 |
| 5,626,887 A | 5/1997 | Chou et al. | 425/129 |
| 5,922,237 A | 7/1999 | Green | 249/141 |
| 5,939,101 A | * 8/1999 | Green | 425/812 |

FOREIGN PATENT DOCUMENTS

| | | | |
|---|---|---|---|
| EP | 0 774 333 A2 | 11/1996 | B29C/33/10 |
| GB | 2 339 163 A | 1/2000 | B29C/33/10 |

* cited by examiner

*Primary Examiner*—James P. Mackey
(74) *Attorney, Agent, or Firm*—Richard B. O'Planick

(57) ABSTRACT

A vent for a mold having a mold cavity comprises a valve member housed within a main body sleeve and reciprocally moveable therein in an axial direction between open and closed positions. The sleeve is mounted within a mold wall and contains an expansion agent such as silicon. An increase in mold temperature causes the expansion agent to expand and move the valve member from the closed position into the open position. An external annular groove is provided within the sleeve to receive displaced mold wall material as the sleeve is press inserted into the mold wall. A tight fit of the sleeve within the mold wall results. The sleeve and valve are configured to allow air to escape in the open position. The valve member is moved to the closed position by material within the mold cavity pressing against the valve member.

16 Claims, 2 Drawing Sheets

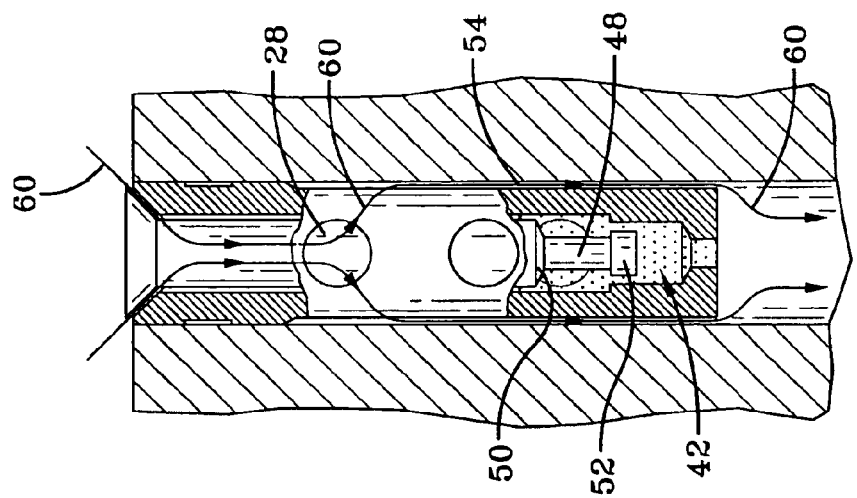
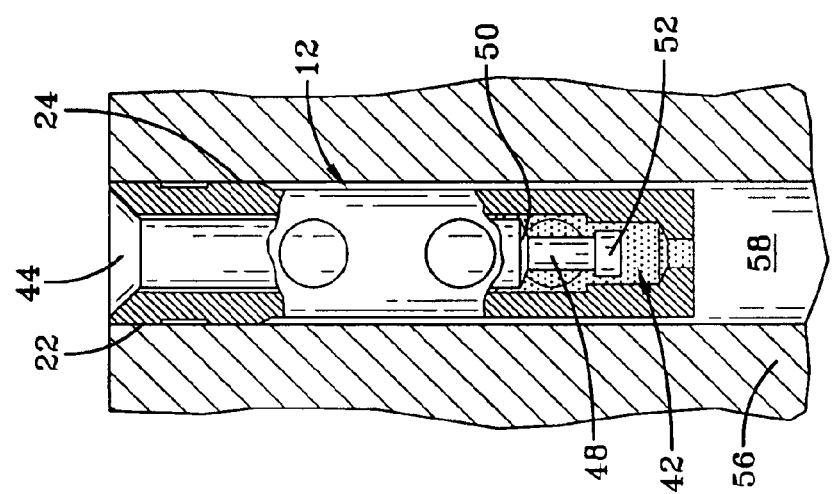
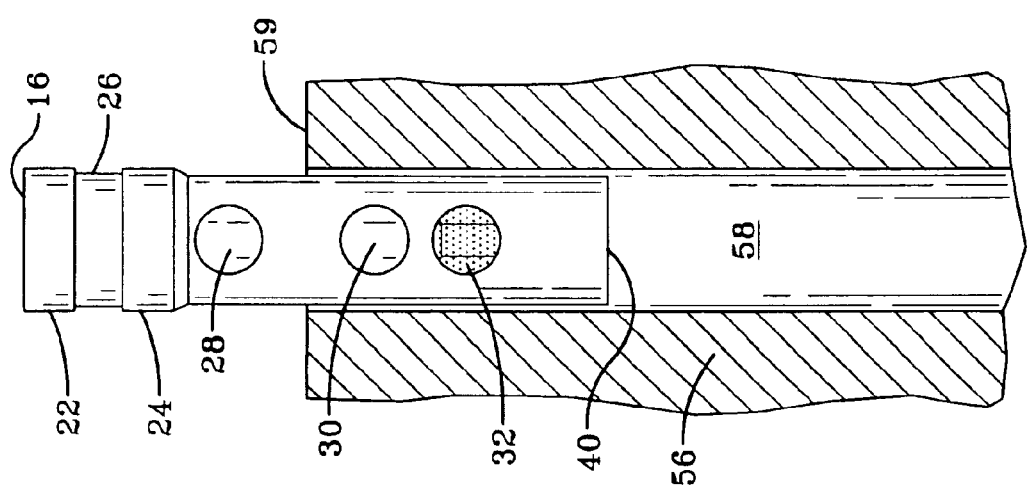

MOLD VENT

FIELD OF THE INVENTION

The present invention relates generally to vents for molds used in forming molded products and particularly but not exclusively to vents for tire molds.

BACKGROUND OF THE INVENTION

In molding rubber articles such as tires, the initial heating of the tire surface in contact with the hot mold rubber so that under the influence of internal molding pressure local rubber flow occurs. Venting is required to allow pockets of air which may become trapped between the green tire carcass and the hot mold to escape so that every part of the curing tire surface contacts the mold and the tire is thus vulcanized with a perfect impression of the mold detail.

Variously configured mold vents have thus been proposed and used to accomplish the above-stated objective. One approach is in the use of small diameter holes drilled through a mold wall normal to the interior surface. Another common approach is the use of "insert vents" that comprise small bore tubes introduced through the mold wall. Once trapped air has vented through the hole rubber begins to flow through the vent. However, the small diameter of the hole ensures that the rubber cures rapidly thus plugging the vent hole and sealing the mold. After completion of the tire curing process these plugs of rubber that are still attached to the tire surface are pulled out of the vent holes when the tire is extracted from the mold.

Such plugs of rubber detract from the visual appeal of the molded tire and are usually removed by trimming. A trimming operation, however, is time consuming and undesirably adds to the cost of the finished tire.

Another problem frequently encountered is that such plugs of rubber may break off when the tire is being extracted from the mold, thus blocking the vent hole. A blocked vent hole may not be immediately apparent and can cause subsequent poor quality moldings.

To solve the aforementioned problems, "spueless" vents have been proposed that allow trapped air to escape but which close to prevent rubber flow. U.S. Pat. Nos. 4,492,554 and 4,347,212 disclose examples of such "sprueless" vents. These known vents comprise a valve held normally open by a coil spring to allow the passage of air. The valve is closed by flowing rubber that moves a valve head portion against the spring tension into seated engagement with a valve seat.

While working well, certain problems remain unsolved by such existing vent configurations. One problem that reoccurs with existing vent configurations is that the vent sleeve is prone to becoming dislodged over time from the mold wall to which it attaches. In other instances, a problem may exist when molds containing such vents are cleaned. Cleaning is commonly effected by blasting the mold surface with a mildly abrasive material such as a plastic grit. However, because conventional vents are open during the cleaning operation it is possible for the cleaning medium to enter and block the vent.

United Kingdom published application GB 2,339,163 A discloses a further embodiment of a known vent that seeks to overcome the problem that occurs when a cleaning medium penetrates into the vent. The application discloses a vent configuration in which a first closure means (bias spring) is used in combination with a second closure means to close the vent when it is cold. This mechanical closure system is an improvement over the prior art but is relative expensive and complicated to fabricate. Moreover, the vent construction does not prevent the vent sleeve from becoming dislodged over time from the mold wall.

Accordingly, the industry remains in need of a vent plug system that can function effectively in venting air when open yet avoid vent obstruction when subjected to a cleaning procedure. Still further, a suitable vent system will be relatively simple and inexpensive to manufacture, incorporate and utilize within a mold, and replace if necessary.

SUMMARY OF THE INVENTION

According to one aspect of the invention, a vent for a mold having a mold cavity is provided comprising a vent main body, a vent valve member disposed within the vent main body and moved by an expansion of a viscous material within the main body to cause the vent valve member to move with respect to the vent main body from a closed to an open position. A further aspect of the invention composes the expanding viscous material of silicon.

According to a further aspect of the invention, a mold with improved venting is provided having a mold cavity defined by a mold wall; a vent main body received within the mold wall; a viscous material contained within a portion of the vent main body; a vent valve member disposed within the vent main body to cause the vent valve member to move with respect to the vent main body from a closed to an open position. Expansion of the viscous material tightens an interference fit between the vent main body and the mold wall to which it attaches.

BRIEF DESCRIPTION OF THE DRAWINGS

The invention will be described by way of example and with reference to the accompanying drawings in which:

FIG. 4 is a side elevation view of the assembled vent partially inserted into a sidewall region of a mold.

FIG. 5 is a side elevation view shown partially in section of the assembled vent fully inserted into a mold sidewall region; and FIG. 6 is a side elevation view show partially in section of the assembled vent fully inserted into a mold sidewall region and with the vent valve in a fully open position.

DETAILED DESCRIPTION OF THE PREFERRED EMBODIMENTS

Figure 1:
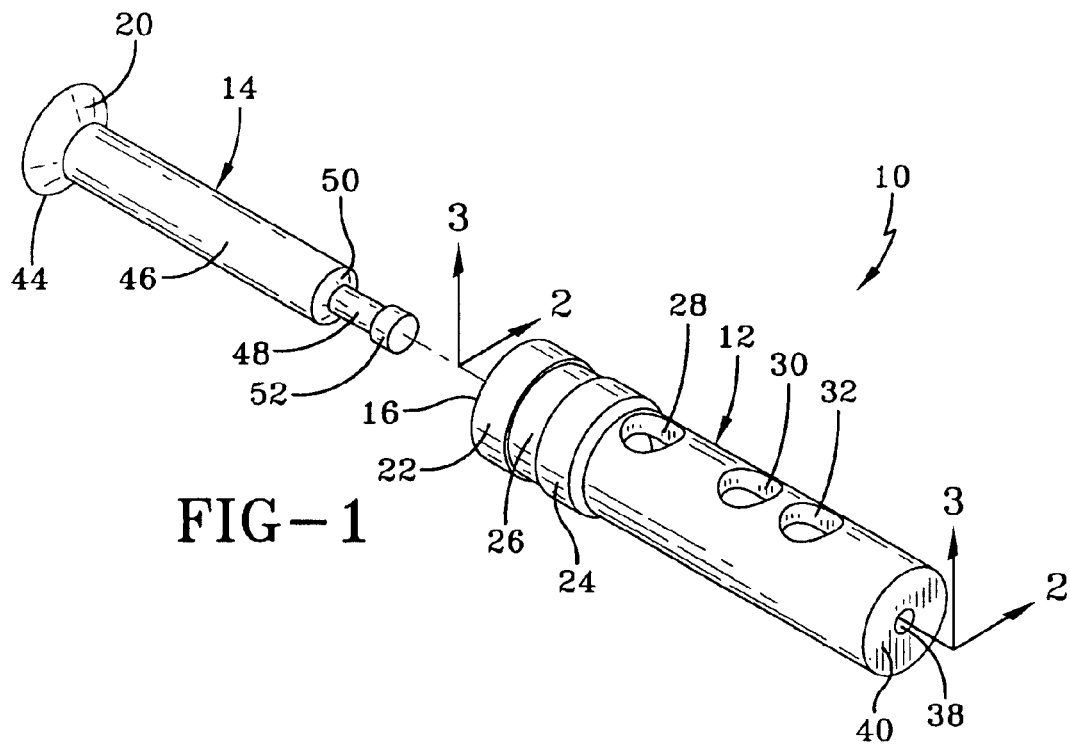
FIG. 1 is an exploded perspective view of the subject vent assembly.
Figure 2:
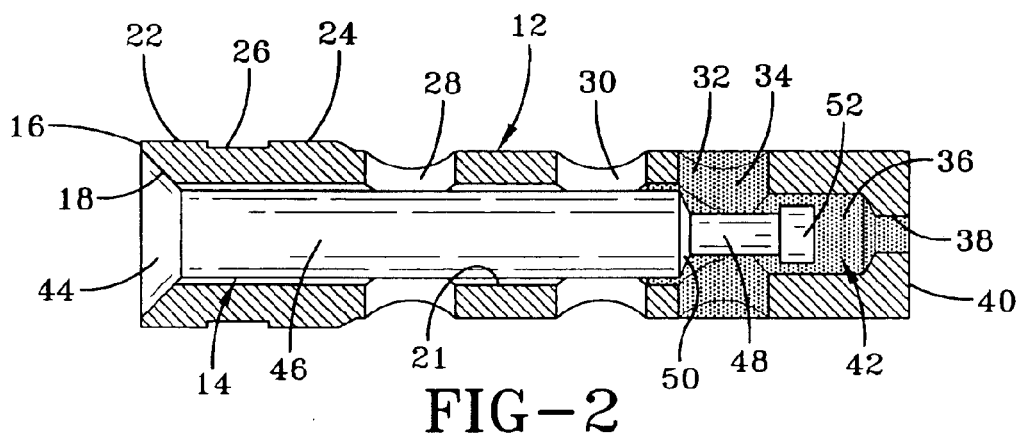
FIG. 2 is a longitudinal section view through the assembled vent shown in the closed position.

Referring first to FIGS. 1 and 2, one embodiment of the subject invention is shown to comprise a mold vent 10 for disposition within a mold wall region. The vent assembly 10 includes a vent main body 12 and a vent closure member 14 (interchangeably referred to herein as "valve member"). The vent main body 12 is generally a tubular structure or sleeve open at both ends to provide an air escape passage through the interior of the main body. At the upper end 16 of the vent main body 12, representing the end disposed at the molding surface, there is an internal conical seat 18. A complementary external conical-shaped vent closure face 20 is disposed on the valve member 14. Closure of the valve occurs when the complementary conical-shaped surfaces of the closure face 20 and the vent seat 18 are brought together by downward movement of the valve member 14 within the main body 12. While a conical seat is preferred, other alternative seat variations known in the art are intended to be within the scope of the invention.

An axial through-bore 21 extends through the sleeve 12. The external profile of the sleeve 12 is configured to provide an annular shoulder 22 at end 16 separated by a second annular shoulder 24 by annular recess or groove 26. As will be appreciated, the groove 26 functions to receive a surplus of segment material forced back by tightening the shoulders 22, 24 of the sleeve in a hole. A series of three orifices 28, 30, and 32 are spaced along the main body 12 and extend through the body sides to communicate with the internal through-bore 21. A transverse counter-bore 34 extends from orifice 32 through the main body 12. The through-bore 21 forms a reservoir 36 rearward from the counter-bore 34 and a lower end opening 38 to bore 21 extends from reservoir 36 through a lower end 40 of the main body 12. The reservoir 36 and counter-bore 34 are filled with an expansion agent 42 pursuant to the invention having the characteristic of volumetric expansion when subjected to a thermal energy source. One such agent is silicon; however alternative expansion agents known in the art may be employed pursuant to the invention.

The valve member 14 is generally a tubular structure having a valve head 44 of relatively large diameter. The conical valve seat 20 represents an underside, rearward facing surface of head 44. Extending rearward from head 44 is a cylindrical valve body 46 that steps radially inward to a valve stem portion 48 along a conical annular shoulder 50. Stem 48 is generally cylindrical and steps outward at a rearward end of the valve 14 to a disc-flange 52. The construction of the members 12, 14 are from any suitably hard material such as, but not limited to, steel.

Figure 3:
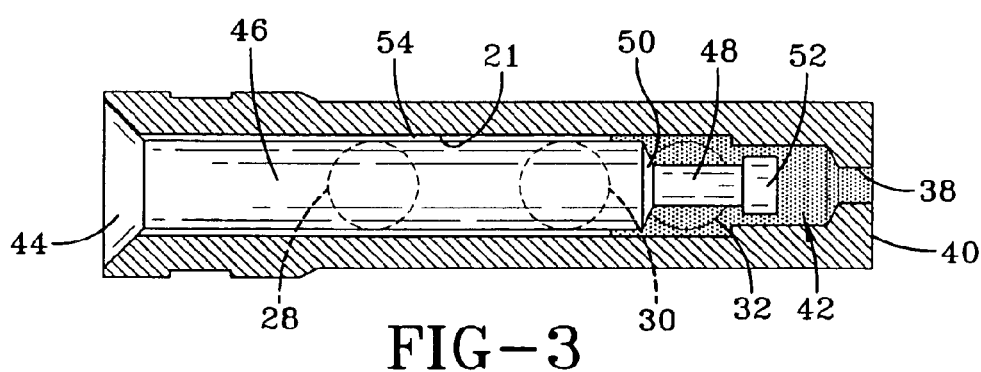
FIG. 3 is a longitudinal section view through the assembled vent rotated ninety degrees from the position shown in FIG. 4.

The vent valve member 14 is received axially within the axial bore 21 of the vent main body 12. When fully inserted, as best seen from FIGS. 2 and 3, there exists a gap 54 between internal sidewalls defining bore 21 and the main body 12. The valve member 14 has an axial length sufficient to extend the end flange 52 into the reservoir 36 when the head 44 is fully seated against upper end 16 of the body 12. The diameter of the assembled vent plug is preferably in the range of two to three millimeters but may be varied according to the application. It will be seen that the rearward portion of the axial bore 21 is filled with the expansion agent such as silicon. The silicon fill extends from the opening 38 forward and fills the reservoir 36 and counter-bore 34. Silicon fills a rearward portion of gap 54 as shown and excess silicon material may be evacuated through the middle orifice 30.

Implementation and operation of the vent plug 10 is illustrated in FIGS. 4, 5, and 6. The vent plug 10 is inserted into a socket bore 58 within a region 56 of a mold. Insertion may be effected through the use of a suitable tool such as a mallet. The vent plug 10 is driven into the socket bore 58 until end 16 is flush with the internal surface 59 of the mold. The groove 26 receives any surplus material forced back by a tightening of shoulders 22, 24 of the sleeve in the hole 58. The groove improves the maintenance of the position of the vent plug within the hole 58 by reducing the force required to install the vent plug. Reduction in force effected by the groove 26 also avoids damage to the head of the vent plug 16 and 44. A snug fit between the sleeve and the hole with minimal insertion force is thereby achieved. The presence of sleeve 12 simplifies the mounting and makes it easier for the vent plug to be brought into a flush relationship with the curing surface. Moreover, the sleeve better protects the conical seating surfaces during mounting. The bore 58 is sized generally to accept the vent plug with minimal interference. Full insertion of the vent plug is shown in FIG. 5. In the position shown, annular flanges 22, 24 abut against internal walls of bore 58 in a friction fit. The diameter of the main body 12 is slightly undersized with respect to the diameter of the bore 58 such that a gap is defined between the body 12 and the bore sidewalls. In the condition shown, the head 44 of the valve 14 is seated against the main body 12 and blocks air from flowing therebetween.

It will be appreciated that the dimensions of the vent plug can be smaller than a conventional vent plug employing a coil spring to allow the passage of air. A vent plug with a diameter of 2 mm for shoulders 22, 24 is possible. The smaller dimensions possible through the use of the invention allows for a better evacuation of the air in a small area.

When temperature increases within the mold up to the curing temperature, the valve opens to the position shown in FIG. 6. Heating of the mold causes the silicon 42 to expand against the valve member 14. Expansion of the silicon against conical annular shoulder 50 forces the valve member 14 to move away in an axial direction, opening an air path 60 between the valve member 14 and the main body 12, beginning at the seated surfaces 18, 20. The axial movement of the valve 14 during the work corresponds to approximately 0.05 mm. The air path 60 proceeds along the outside of the valve member 14 until reaching orifice 28. The air then escapes through orifice 28 and progresses rearward along the gap 54 between the valve member 14 and the sleeve 12. Upon reaching the end 40 of the vent plug, the air flows into the mold bore 58 and is evacuated.

Expansion of the silicon within the sleeve 12 further brings a complementary radially outward tightening of the sleeve against the mold bore sidewalls. As a result, the mold plug fit is tightened and unintended extraction of the mold plug from the mold wall during the heating and cooling cycle is avoided. In operation of the vent in the molding of a rubber tire, trapped air escapes through the open vent until the rubber impinges onto the end head 44 and pushes the valve member 14 into the main body 12 to bring the conical faces 18, 20 into seated engagement so to close the air escape passage 60 therebetween. When the vent-plug is closed, the conical surfaces 20 of the valve and 18 of the sleeve have a perfect fit because the elasticity of the silicon permits the valve 14 to have a limited movement, approximately 0.05 mm due to silicon expansion. This limited movement is beneficial and favors the adjustment of conical surfaces 20 and 18 as the valve closes. The silicon material 42 then cools to room temperature, the mold internal surfaces are cleaned by conventional means such as abrasive cleansing, and the cycle is repeated.

It will be noted that the subject vent plug accomplishes the stated objectives by providing an assembly comprising relatively few component parts. Intricate and expensive means for biasing the valve member open are avoided. The use of silicon or other suitable expansion agent functions predictably through repeated thermal cycles. In addition, the expansion of the silicon not only acts to open the valve but also tightens the sleeve within the mold sidewall. It will further be appreciated that the valve closes as when rubber flowing within the mold contacts head 44 and forces the valve member 14 into seated engagement with the main body 12. At room temperature, the valve is in the closed position represented in FIGS. 2 and 3 and allows for a sand blasting of the mold internal surfaces with the vent plugs flush within the mold sidewalls. Moreover, the subject vent valve is mounted flush with the interior wall of the mold and the valve seats flush with the molding surface. Thus, there is little material migration into the valve resulting in a sprueless end product such as a tire. The elimination of sprues avoids the cost of post-mold removal and enhances the appearance of the finished product.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vent for a mold having a mold cavity comprising:
   a vent main body;
   a vent valve member disposed within the vent main body and moved by expansion of viscous material within the main body to cause the vent valve member to move with respect to the vent main body from a closed to an open position.

2. A vent according to claim 1 wherein the expansion material comprises silicon.

3. A vent according to claim 1 wherein the vent main body comprises an elongate sleeve containing the expansion material and the main body includes at least one air vent hole extending therein to allow air to escape around the valve member when in the open position.

4. A vent according to claim 3 wherein the sleeve comprises a compartment for isolated containment of the expansion material relative to the air vent hole.

5. A vent according to claim 1 wherein the valve member and the main body comprise complementary shaped surfaces that are seatingly engaged when the valve member is in the closed position.

6. A vent according to claim 5 wherein the complementary shaped surfaces of the vent main body and the valve member are conical surfaces.

7. A vent according to claim 1 wherein the valve member moves reciprocally between the closed and open positions, the expansion material expanding volumetrically to cause the valve member to move into the open position and contracting volumetrically as the valve member returns to the closed position.

8. A vent according to claim 5 wherein a flow of material within the mold contacts the valve member to cause the valve member to move into the closed position.

9. A vent according to claim 1 wherein the vent main body is received in an interference fit within a mold cavity wall and includes an annular groove positioned to receive displaced material from the mold cavity wall as the main body is pressured into the mold cavity wall.

10. A mold having improved venting, comprising:
    a mold cavity defined at least partially by a mold wall;
    a vent main body received within the mold wall;
    a viscous material contained within at least a portion of the vent main body;
    a vent valve member disposed within the vent main body and moved by an expansion of the viscous material within the main body to cause the vent valve member to move with respect to the vent main body from a closed to an open position.

11. A mold according to claim 10, wherein the vent main body comprises an elongate sleeve and the vent valve member axially moves within the sleeve between the open and closed positions.

12. A mold according to claim 11, wherein the viscous material comprises silicon.

13. A mold according to claim 11, wherein the sleeve comprises at least one air vent hole extending therein to allow air to escape around the valve member in the open valve position.

14. A mold according to claim 1 wherein the viscous material expands to axially move the valve member relative to the sleeve.

15. A mold according to claim 14, wherein the sleeve is received in an interference fit within a mold cavity wall and includes an annular groove positioned to receive displaced material from the mold cavity wall as the sleeve is pressured into the mold cavity wall.

16. A mold according to claim 15, wherein a flow of material within the mold contacts the valve member to cause the valve member to move into the closed position.

* * * * *